United States Patent
Thomsen et al.

(10) Patent No.: US 9,145,869 B2
(45) Date of Patent: Sep. 29, 2015

(54) PITCH BEARING

(75) Inventors: Jens Thomsen, Brande (DK); Kim Thomsen, Ikast (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 688 days.

(21) Appl. No.: 13/441,972

(22) Filed: Apr. 9, 2012

(65) Prior Publication Data

US 2012/0263598 A1 Oct. 18, 2012

(30) Foreign Application Priority Data

Apr. 14, 2011 (EP) ..................................... 11162405

(51) Int. Cl.
F03D 11/00 (2006.01)

(52) U.S. Cl.
CPC ........... F03D 11/0008 (2013.01); *Y02E 10/721* (2013.01); *Y02E 10/722* (2013.01); *Y10T 29/49723* (2015.01)

(58) Field of Classification Search
CPC ... F03D 11/008; Y02E 10/721; Y02E 10/722; Y10T 29/49723
USPC .................. 416/205, 207, 208, 209
See application file for complete search history.

(56) References Cited

U.S. PATENT DOCUMENTS

| | | | |
|---|---|---|---|
| 1,634,330 A * | 7/1927 | Malm | 416/208 |
| 1,769,775 A * | 7/1930 | Dicks | 416/208 |
| 1,866,580 A * | 7/1932 | Schmitthenner | 416/205 |
| 1,897,536 A * | 2/1933 | Squires | 416/208 |
| 2,636,720 A * | 4/1953 | Forrest | 416/208 |
| 3,103,978 A * | 9/1963 | Chadwick et al. | 416/167 |
| 3,545,884 A * | 12/1970 | Schroeter et al. | 416/205 |
| 3,687,569 A * | 8/1972 | Klompas | 416/156 |
| 4,834,559 A * | 5/1989 | Kalvoda | 384/118 |
| 4,934,904 A * | 6/1990 | Kennedy | 416/207 |
| 5,743,657 A * | 4/1998 | O'Reilly et al. | 384/312 |
| 6,050,727 A * | 4/2000 | Messmer et al. | 384/99 |

(Continued)

FOREIGN PATENT DOCUMENTS

| | | |
|---|---|---|
| DE | 10043936 A1 | 4/2002 |
| DE | 102005039434 A1 | 2/2007 |

(Continued)

OTHER PUBLICATIONS

Klinger, DE102005039434 English machine translation, Translated by Epsacenet Oct. 22, 2014.*

(Continued)

*Primary Examiner* — Nathaniel Wiehe
*Assistant Examiner* — Wayne A Lambert

(57) ABSTRACT

A pitch bearing is described for connecting a blade of a wind turbine to a hub of the wind turbine to allow a rotation of the blade about a longitudinal axis, which pitch bearing includes a console housing arranged at a conjunction of the hub and an end section of the blade, which console housing encloses a plurality of planar sliding surfaces arranged around an opening in the hub. Further described is a wind turbine including at least one blade attached to a hub via such pitch bearing. A method of performing maintenance on a pitch bearing is described where a part of the pitch bearing is removed while leaving the blade and the remaining parts of the pitch bearing in place; and the part is replaced after a maintenance step has been carried out.

16 Claims, 5 Drawing Sheets

(56) References Cited

U.S. PATENT DOCUMENTS

| | | | |
|---|---|---|---|
| 6,547,038 B1* | 4/2003 | Thomsen et al. | 184/6.8 |
| 6,623,164 B1* | 9/2003 | Gozdawa | 384/117 |
| 6,746,152 B2* | 6/2004 | Branagan | 384/122 |
| 6,814,493 B2* | 11/2004 | Wobben | 384/420 |
| 7,458,776 B2* | 12/2008 | LLorente Gonzalez et al. | 416/9 |
| 7,854,592 B2* | 12/2010 | Bech | 416/155 |
| 7,862,239 B2* | 1/2011 | New | 384/122 |
| 2010/0109327 A1* | 5/2010 | Nielsen et al. | 290/44 |
| 2011/0012360 A1* | 1/2011 | Numajiri | 290/55 |
| 2011/0095537 A1* | 4/2011 | Numajiri | 290/55 |
| 2011/0188988 A1* | 8/2011 | Wadehn | 415/1 |
| 2011/0254281 A1* | 10/2011 | Noda et al. | 290/55 |

FOREIGN PATENT DOCUMENTS

| | | |
|---|---|---|
| EP | 1365147 A2 | 11/2003 |
| WO | WO 2010146654 A1 | 12/2010 |

OTHER PUBLICATIONS

Goebel, DE10043936 English machine translation, Translated by Epsacenet Oct. 22, 2014.*

Kottwitz et al, EP1365147 English machine translation, Translated by Epsacenet Oct. 22, 2014.*

* cited by examiner

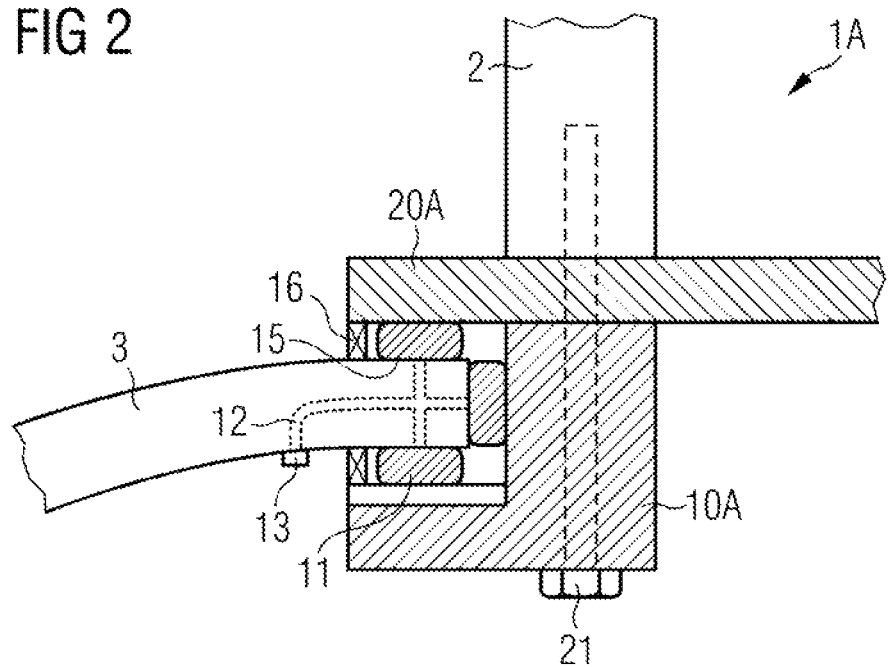
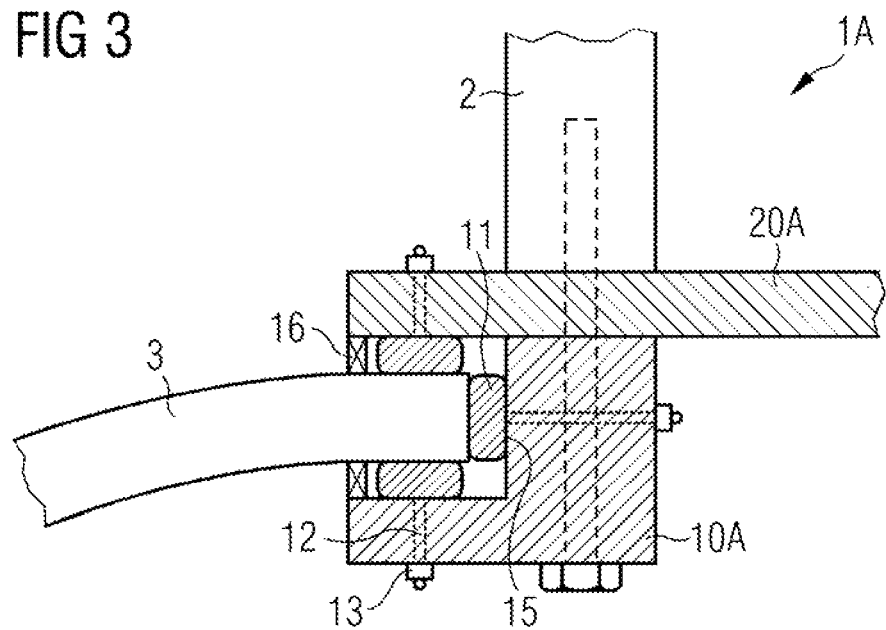

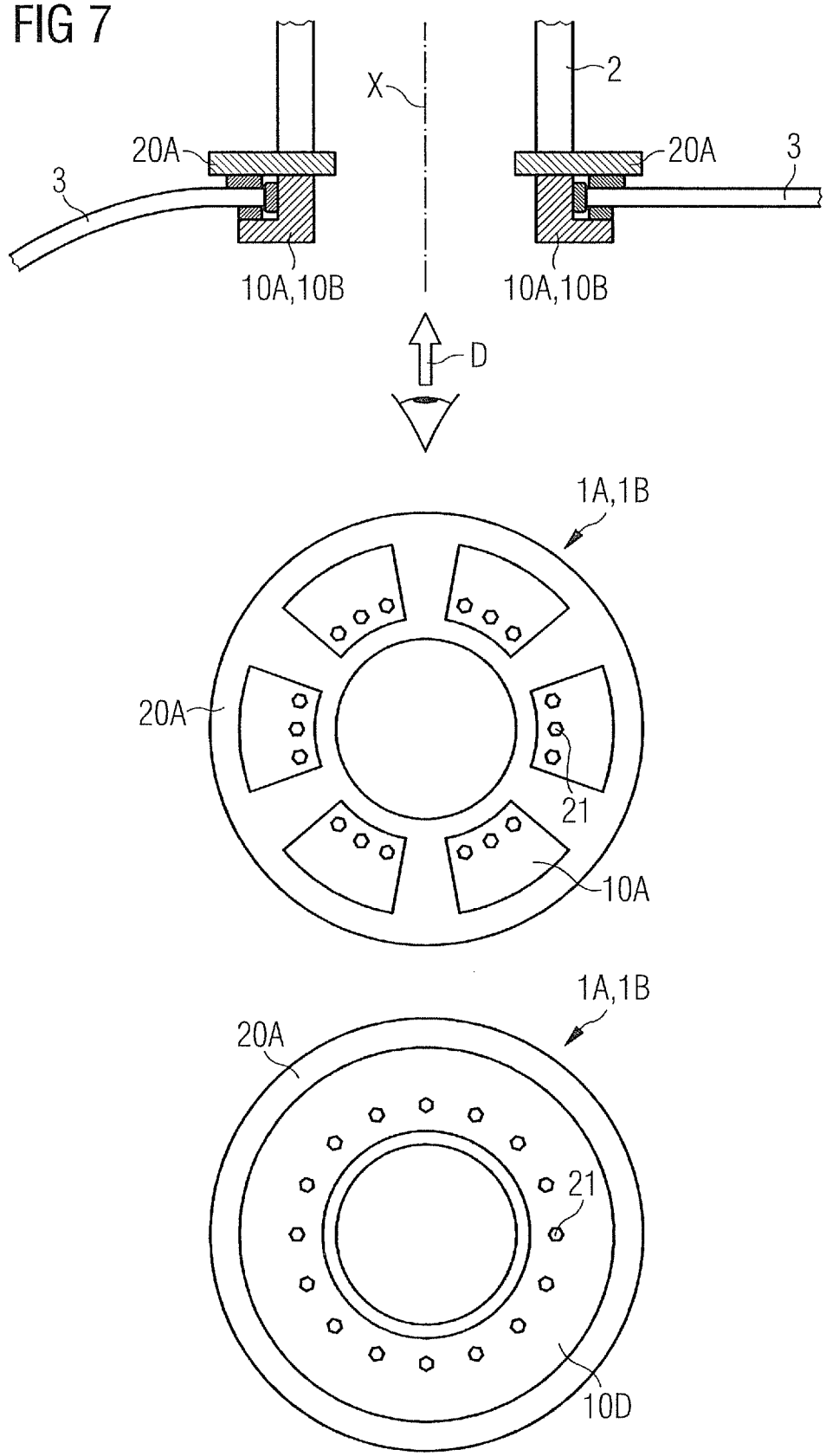

PITCH BEARING

CROSS REFERENCE TO RELATED APPLICATIONS

This application claims priority of European Patent Office application No. 11162405.2 EP filed Apr. 14, 2011. All of the applications are incorporated by reference herein in their entirety.

FIELD OF INVENTION

The invention describes a pitch bearing, and a wind turbine for which a blade and a hub are connected by means of such a pitch bearing.

BACKGROUND OF INVENTION

A wind turbine generally has several blades connected to a hub, so that the blades cause the hub to rotate during operation. To alter the angle of pitch of a blade, it can be connected to the hub using a pitch bearing. A pitching system, usually installed in the hub, can drive the pitch bearing to adjust the pitch of the blade. In prior art systems, the pitch bearing is a roller or ball bearing. The roller bearings must be precisely machined using a high quality steel in order to ensure a satisfactorily long lifetime. The race is sealed to keep the lubricant in and moisture out. In order to replace a damaged bearing, the blade must be removed. This can be very time-consuming and expensive. While the bearing is being repaired, the blade must be supported, for example by a crane.

However, the increasing size of wind turbines and increasing trend toward offshore turbines puts high demands on serviceability and robustness that the prior art roller bearing systems cannot satisfy. A roller bearing is only practicable for blades up to a certain length and/or weight, since the load exerted on the bearing by a very long and/or heavy blade is correspondingly high. The large dynamic loads and corresponding structural deflections combined with strict requirements for quality and handling make the prior art roller bearings problematic and costly. Furthermore, the necessity of a crane to support a blade while the roller bearing is being repaired is even more costly for an offshore turbine.

SUMMARY OF INVENTION

An improved pitch bearing, wind turbine, and method of performing maintenance of such a pitch bearing that overcomes the problems mentioned above is described.

A pitch bearing (for connecting a blade of a wind turbine to a hub of the wind turbine to allow a rotation of the blade about a longitudinal axis) comprises a console housing arranged at a conjunction of the hub and an end section of the blade, which console housing encloses a plurality of planar sliding surfaces arranged between the blade end section and the hub.

The pitch bearing may be made of parts that do not require precision machining, and can therefore be realised at relatively low cost. The planar sliding surfaces may provide sufficient freedom or movement for the blade, so that the pitch of the blade may be adjusted as required. Furthermore, the planar sliding surfaces may distribute the loads exerted on the bearing without suffering any significant damage. Therefore, such a pitch bearing requires relatively little maintenance and is therefore very economical in this regard also.

A wind turbine comprises at least one blade attached to a hub, wherein the blade is connected to the hub by means of such a pitch bearing.

The hub and blades of the wind turbine may be finished specifically to suit such a pitch bearing. Alternatively, an already operational wind turbine may be upgraded by replacing the existing roller bearings by the disclosed bearings.

The method of performing maintenance on such a pitch bearing comprises the steps of removing a part of the pitch bearing while leaving the blade and the remaining parts of the pitch bearing in place, and replacing the part after a maintenance step has been carried out.

A very significant savings may be made owing to the very straightforward manner in which maintenance may be carried out. The blade may remain connected to the hub by means of the pitch bearing for the entire maintenance procedure, since there is no need to remove the blade from the pitch bearing in order to access damaged or worn elements of the bearing. Instead, only the relevant part of the pitch bearing need be removed or disconnected, and, once the part has been repaired or replaced, it may be re-connected once more to the pitch bearing. Here, the term 'removing a part of the pitch bearing' might mean completely detaching the part from the pitch bearing, or simply loosening the part in order to obtain access to a space behind that part. Evidently, a maintenance procedure may be carried out safely and quickly when the blade is connected to the hub using a pitch bearing.

Further features are given by the dependent claims, as revealed in the following description. Features of the different claim categories may be combined as appropriate to arrive at further embodiments.

The pitch bearing is a sliding bearing, since the parts (blade and hub) connected by the bearing essentially slide relative to each other. Therefore, the terms 'pitch bearing', sliding bearing' or simply 'bearing' may be used interchangeably below.

In the following, a blade is assumed to have an essentially cylindrical root portion (or just 'root'), which is connected to a circular opening in the hub by means of the pitch bearing, which allows the blade to rotate at least partially about a longitudinal axis of rotation through the cylindrical root portion.

The pitching system for driving a pitch bearing may be any suitable pitching system, for example a pitching system arranged in the hub and comprising a toothed gear arranged to engage with the teeth of a circular toothed rail arranged around a suitable part of the pitch bearing. Another example is to use hydraulic cylinders to drive the pitch movement. An existing pitching system may be used directly or adapted as necessary.

The console housing serves to clamp the blade root against the circular opening in the hub, such that the blade is still free to rotate about a longitudinal axis of rotation. The console housing may have any appropriate shape or design. In one embodiment, the console housing comprises a sliding ring dimensioned to cover the blade root, with an outer diameter larger than that of the blade root, so that the sliding ring lies on the exterior surface of the hub while the remainder of the console housing is arranged in the interior of the hub, and may be accessed for maintenance.

In addition, the console housing comprises one or more parts that, in conjunction with the sliding ring, serve to clamp onto a fixed part, for example the hub. To this end, the console housing is preferably detachably connected to a root of the blade and/or to the hub. For example, the console housing may be bolted to the blade root using bolts inserted through axial through holes running essentially parallel to the axis of rotation of the blade. Since the blade must be connected in some way to the hub, a blade usually always comprises such axial through holes for accommodating bolts, and these may be made use of by the pitch bearing.

In one embodiment, the console housing may comprise a console ring, i.e. an annular part or clamping ring shaped to match the circular shape of the blade root. The console ring, sliding ring and blade may be fastened together in such a way that the blade is rotatable about its axis of rotation while being securely mounted onto the hub. Such a console ring need not be entirely removed to service the bearing. The console housing may comprise a plurality of console housing segments in place of a closed ring. For example, depending on the diameter of the blade root, a console housing of a bearing may comprise six, eight, or any number of console segments. These may be arranged essentially evenly about the bearing. Thereby one or more such console segments may be removed partially or completely, while the remaining segments continue to hold the blade in place, so that the pitch bearing may be serviced in a particularly straightforward and cost-effective manner.

To securely grasp the hub or blade, the console housing (i.e. the console ring or a console segment) may comprise an angular profile shaped, for example, to fit around a perimeter of an essentially circular opening in the hub, or around the essentially circular blade root. A suitable profile shape might be an L-shape, a V-shape, a C-shape, a U-shape, etc., as long as the console housing may clamp or grasp the relevant part in a satisfactorily secure manner.

The planar sliding surfaces may be made to exhibit any properties suitable for a sliding bearing. For example, the surfaces that slide relative to each other may be machined so that the opposing surfaces are as parallel as possible. If a material such as a metal or ceramic is used, the surfaces may be polished to remove any unevenness. A suitable metal might be a metal alloy such as babbitt. A planar sliding surface may comprise a suitable coating, for example a polymer surface coating. A polymer sliding pad may exhibit improved resistance to wear, and may reduce the static and dynamic coefficients of friction in the bearing. Of course, the bearing may comprise a combination of various different planar sliding surfaces.

The sliding surfaces may be surfaces of a blade part, or surfaces of a hub part. Alternatively, the planar sliding surfaces may be the surfaces of one or more sliding pads arranged in the console housing between the blade end section and the hub. An advantage of using sliding pads in the console housing is that such sliding pads may easily be replaced should they wear down over time. Materials such as polymers may be used, and flat sliding pads made of a suitably durable polymer may easily be manufactured to fit into the console housing. Another advantage of using sliding pads is that a better clamping tension may be achieved, as will be explained below.

Sliding pads may be arranged on a plurality of faces of the angular profile of the console housing, so that all sides of the part being clamped by the console housing are 'padded'. In this way, the blade may move with very little friction relative to the hub, and loads exerted on the blade may be optimally absorbed by the bearing. A sliding pad may be a single annular ring shaped to fit the console housing, or may comprise a plurality of smaller sliding pads arranged in the console housing.

A sliding pad may be fixed on one side to a face of the console housing, or to a face of the part being clamped. The sliding pad may be fixed in place using any appropriate technique, for example using an adhesive, a number of bolts, etc. In a preferred embodiment, a sliding pad may be kept in place by inserting it at least partially into a suitably dimensioned recess, pocket or groove formed on a face of the console housing or on a face of the part to be clamped. For example, if the console housing is designed to clamp a perimeter of the circular opening in the hub, the sliding pads may be fastened in some suitable manner about that perimeter. The sliding surface of the sliding pad then faces into the console housing. Alternatively, one surface of the sliding pad is fastened to a face of the console housing, while the other, sliding, surface faces onto the part being clamped. In this realisation, a segment of the console housing may be replaced by a replacement segment to which a replacement sliding pad has already been attached.

As indicated above, the console housing clamps onto an appropriate part or element in order to securely connect the blade to the hub. To ensure a satisfactorily 'tight' fit, the console housing may be subject to a pre-tensioning before using it to connect the blade to the hub. For example, the parts of the console housing that fit around the part being clamped may be subject to an initial deliberate 'deformation', ensuring that the bearing, once in place, is favourably tight. In one approach, the clamped part may be made slightly too thick to fit into the clamping component, or vice versa, so that there is an initial pre-tension when these are bolted together. Alternatively, outer edges of the clamping part may be initially bent or 'deformed' to fit very tightly over the part to be clamped, or vice versa.

It may be desirable to adjust the tension or degree of clamping during the lifetime of the bearing. The console housing may comprise a tension adjustment means for adjusting the position of a sliding pad in the console housing. Such a tension adjustment means might comprise an element on the exterior of the console housing that may alter the position of a sliding pad within the console housing. For example, and adjusting screw may be turned to push a sliding pad further into the housing to a greater or lesser extent, depending on the direction in which the screw is turned. Other embodiments might include a combination of mechanical, hydraulic or electric systems allowing for manual or automatic adjustment of tension or clearance. The positioning of the sliding surface may be combined with the operation of the turbine by varying the clearance or pretension and thereby changing the characteristics of the bearing system, for example stiffness and friction. The actual position of the sliding surface may be used to estimate wear of the sliding surface.

The bearing may be realised as a 'dry' bearing, i.e. without any lubrication. To reduce friction in the bearing, lubricated sliding pads, preferably sliding pads with built-in lubricant, may be used, for example a sliding pad may comprise a material such as a polytetrafluoroethylene (PTFE) or ultra-high-molecular-weight polyethylene (UHMWPE) composite. In another approach, to improve the sliding performance of the bearing, i.e. to minimize or reduce the friction in the housing, the bearing may comprise a lubrication system for introducing a lubricant into the console housing. The lubricant may be introduced automatically, or without having to disassembly and parts of the bearing. The lubrication system may comprise a number of lubrication channels through the console housing and/or through the part that is clamped by the console housing. For example, the body of the console housing may comprise a narrow duct or channel arranged to open into the console housing. If sliding pads are used, the duct may open onto the sliding surface of a sliding pad. Lubricant may be pumped, for example under pressure, by the lubrication system into the console housing so that the blade may always move freely relative to the hub. The amount of lubricant may be determined on the fly using any suitable sensor or controller to determine the required amount. Under low pressure, the lubricant will serve for general friction and wear reduction. Under high pressure, the lubricant will separate the opposing sliding surfaces and therefore reduce wear and friction considerably. The high-pressure option may be a backup solution that may be activated when the lubrication system is unable to overcome the static friction under low pressure. The energy for the lubrication system may be stored in a pressure tank, battery or similar energy storage system.

During operation, the resistance to rotation may be measured and used to calculate operational parameters such as wear, lubricant state, stiffness and pre-tension of sliding surfaces. The measurements may then be used to adapt lubricant intervals or to calculate various service-related parameters such as the time to next service, change of pre-tension, etc.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the limits of the invention.

FIG. 2 shows a pitch bearing according to a first embodiment;

FIG. 3 shows a pitch bearing according to a second embodiment;

FIG. 7 shows a plan view and a cross-section of a pitch bearing of FIGS. 2 to 6;

DETAILED DESCRIPTION OF INVENTION

Figure 1:
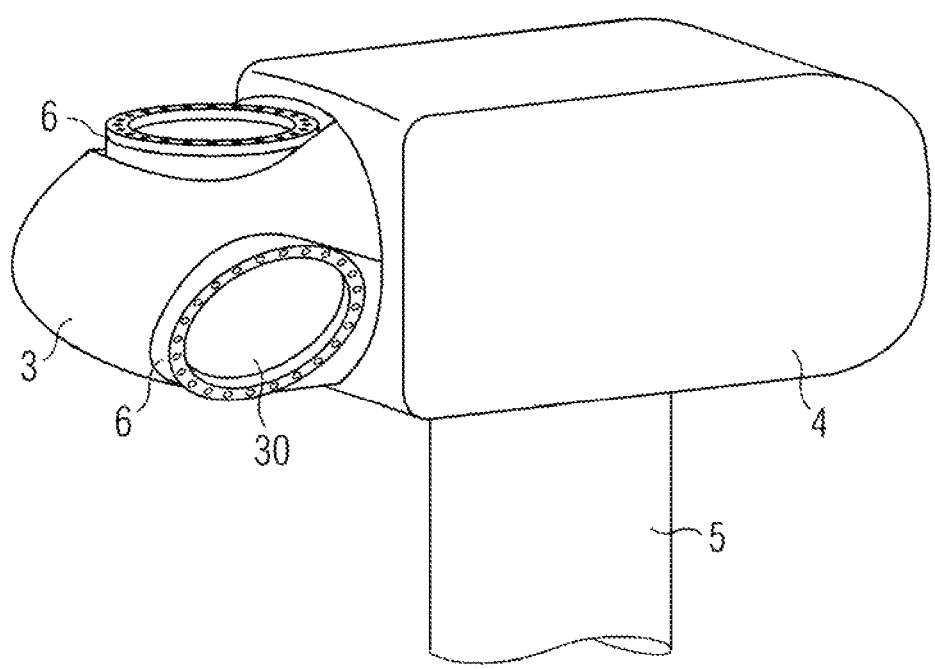
FIG. 1 shows a wind turbine with a prior art pitch bearing.

In the drawings, like reference numbers refer to like objects throughout. Objects in the diagrams are not necessarily drawn to scale.

FIG. 1 shows a wind turbine comprising a hub 3 to which a number of blades may be connected. During operation, the blades caused the hub 3 to rotate, so that electricity may be generated by an electric generator enclosed inside a nacelle 4 mounted on top of a tower 5. The diagram shows a prior art pitch bearing 6 comprising a race or cage enclosing a large number of roller bearings, arranged at a circular opening 30 in the hub 3, which circular opening 30 corresponds to the circular shape of a blade root. The pitch bearing 6 may be driven by a pitching system enclosed inside the hub 3. The roller bearings must be precisely machined using a high quality steel in order to ensure a satisfactorily long lifetime. The race is sealed to keep the lubricant in and moisture out. In order to access the bearings, for example to replenish the lubricant or to replace a damaged bearing, the race must be dismantled. This may be time-consuming and expensive, particularly since the blade must be detached from the hub during the maintenance procedure. Furthermore, such a roller bearing is only practicable for blades up to a certain length and/or weight, since the load exerted on the bearing by a very long and/or heavy blade is too high. In other words, there is a limit to the extent to which a roller bearing may be scaled up for use as a pitch bearing for a wind turbine.

FIG. 2 shows a pitch bearing 1A according to a first embodiment. The diagram shows a partial cross-section through a hub 3 and the cylindrical end section of a blade 2, and only a part of the blade wall is shown. For simplicity, the manner in which a pitching system turns the pitch bearing to rotate the blade 2 about an axis X of rotation is not shown in the this and the following diagram. The console housing 10A, 20A comprises a console segment 10A and a sliding ring 20A arranged at the base of the blade 2. The console segment 10A and the sliding ring 20A comprise through holes to match an axial bolt hole in the blade 2, so that these parts 10A, 20A, 2 may be firmly bolted together using a suitable bolt 21. The through holes and the bolt hole may comprise threaded bushings. Alternatively, a threaded bushing may be arranged in the bolt hole of the blade 2 only.

The console segment 10A and the sliding ring 20A are arranged to form an essentially U-shaped console housing 10A, 20A to clamp or grasp the perimeter of a circular opening in the hub 3. In this embodiment, the pitch bearing 1A contains a number of sliding pads 11, arranged so that a sliding pad 11 lies on each of the three faces of the console housing. The sliding pads 11 in this embodiment are fastened to the faces of the console housing 10A, 20A. Sliding surfaces 15 of the sliding pads 11 face onto the surfaces of the hub 3. To ensure a frictionless motion during adjustment of the blade pitch, a lubricant may be introduced into the bearing 1A. In this embodiment, channels 12 (indicated by the dotted lines) are drilled into the body of the hub around the circular opening, so that a lubricant may be forced between a sliding surface 15 and a surface of the hub 3. The lubricant is contained in the bearing 1A by nipples 13 that close the channels 12, and by a seal 16 that seals the bearing 1A.

FIG. 3 shows a pitch bearing 1A according to a second embodiment. The elements of the bearing 1A are similar to those described in FIG. 2. In this embodiment, however, the sliding pads 11 are fastened to the hub 3, so that the sliding surfaces 15 of the sliding pads 11 face into the console housing 10A, 20A. In this embodiment, channels 12 are drilled into the console segment 10A and the sliding ring 20A, so that a lubricant may be forced between a sliding surface 15 and an interior surface of the bearing 1A. The 'horizontal' channels in the console segment 10A may be arranged between adjacent axial bolt holes. Again, the lubricant is contained in the bearing 1A by nipples 13 that close the channels 12 and provide manual access to the channels 12, and by a seal 16 that seals the bearing 1A.

Figure 4:
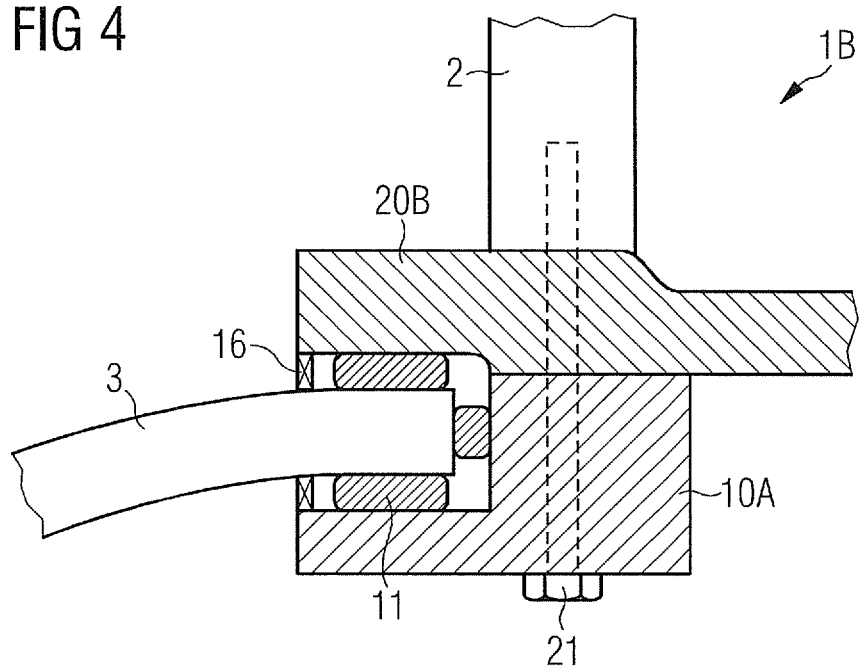
FIG. 4 shows a pitch bearing according to a third embodiment.

FIG. 4 shows a pitch bearing 1A according to a third embodiment, which differs from the embodiments described in FIG. 2 and FIG. 3 above in that there is no lubrication system involved. Instead, the sliding surfaces are realised to not require any lubricant. A suitable material for the sliding surfaces might be babbit or a polymer. In such an embodiment, sliding pads may be fastened to either the hub or an interior face of the bearing 1B.

Figure 5:
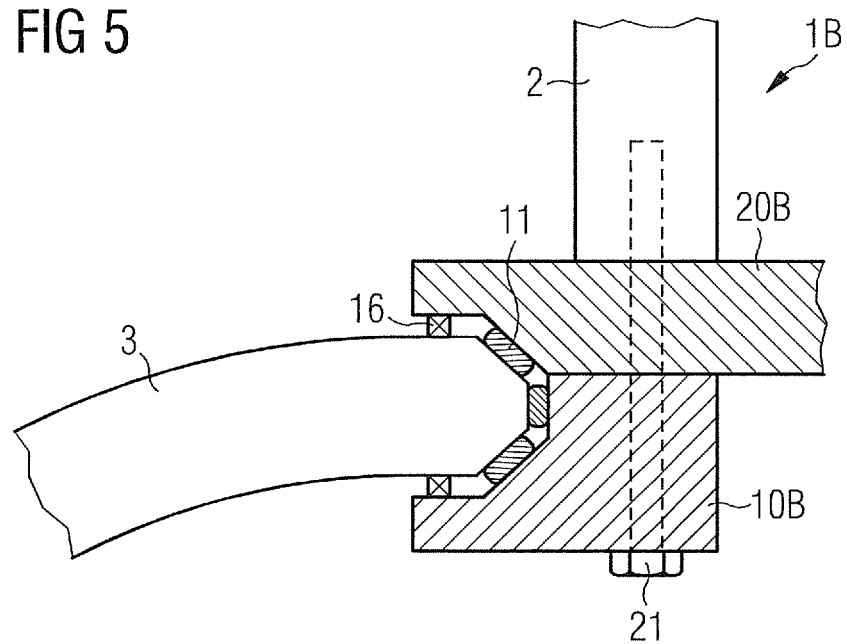
FIG. 5 shows a pitch bearing according to a fourth embodiment

FIG. 5 shows a pitch bearing 1B according to a fourth embodiment. Here, the console segment 10B and the sliding ring 20B are shaped to give a console housing 10B, 20B with more faces, giving a more 'curved' or tapered interior. This allows an 'outer' sliding pad 11 to be arranged at an oblique angle to a middle sliding pad 11, instead of arranging them at right angles to each other, as was the case for the embodiments shown in FIGS. 2-4. This alternative arrangement allows a better distribution of the forces acting on the blade 2 during operation. A tapered design also gives the bearing a self-centering ability.

To ensure a good fit between the pitch bearing 1A, 1B and the hub 3 in the embodiments shown above, the pitch bearing 1A, 1B may be subject to a pre-tensioning before it is mounted onto the blade 2 and hub 3. For example, the outer ends of the console segment 10A, 10B and the sliding ring 20A, 20B (here, 'outer ends' means the regions of these components 10A, 10B, 20A, 20B that are furthest away from an axis of rotation of the blade 2) may initially be bent inward to a certain extent, so that, when the components 10A, 10B, 20A, 20B, 2 are bolted together, the sliding pads 11 are pressed against the hub 2 and the interior faces of the console housing 10A, 10B, 20A, 20B.

Figure 6:
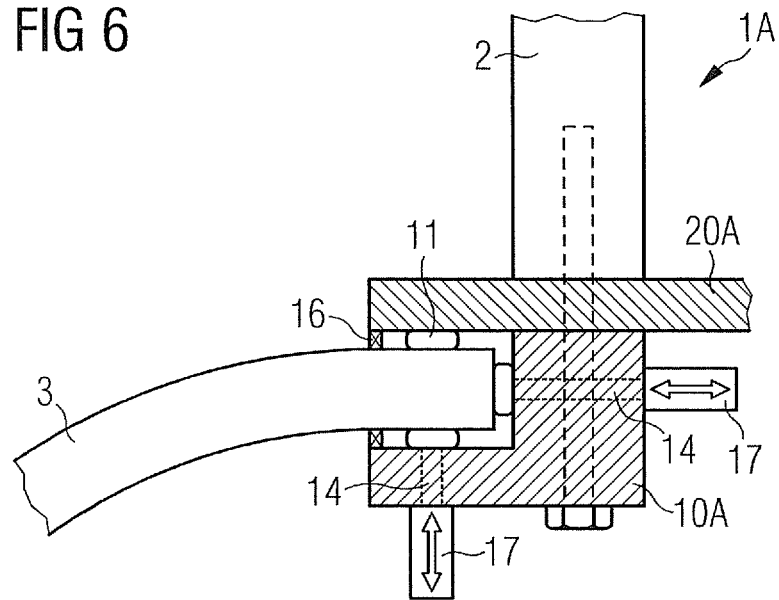
FIG. 6 shows a pitch bearing according to a fifth embodiment.

FIG. 6 shows a pitch bearing 1A according to a fifth embodiment. Here, the tension of the pitch bearing 1A may be adjusted after mounting. An adjusting means is arranged in the body of the console segment 10A. An adjusting screw 14 may be turned using a suitable adjusting means 17 to increase or reduce pressure on a sliding pad 11, so that this may be pressed against a surface of the hub 3 in a controlled manner. Again, a 'horizontal' bushing for such an adjusting screw 14 may be arranged between adjacent axial bolt holes in the console segment 10A. Such an adjustment might become necessary in time, for example if a sliding pad 11 becomes worn down or distorted as a result of the loads exerted on it during operation.

FIG. 7 shows a plan view and complete cross-sections of two embodiments of the pitch bearing 1A, 1B of FIGS. 2 to 6 seen from 'underneath' (i.e. from inside the hub 3) in the direction of viewing D. In the centre of the diagram, the pitch bearing 1A, 1B comprises several console segments 10A and a sliding ring 20A bolted to the blade 2. The diagram shows six console segments 10A, but of course any suitable number of segments may be used, depending, for example, on the diameter of the blade. The diagram also shows how easy it is to access the pitch bearing 1A, 1B from within the hub 3. Maintenance may easily be carried out, since it is not difficult to remove the bolts from one console segment 10A in order to access its sliding pads. While one console segment 10A is being replaced or repaired, the other console segments 10A continue to hold the blade 2 in place. In the lower part of the diagram, an alternative realisation of the pitch bearing is shown, also seen from 'underneath', using a one-piece console ring 10D. This realisation may give a very satisfactory performance as a bearing if the sliding surfaces are low-maintenance surfaces, for example if sliding pads with built-in lubricant are used, or if no sliding pads are used at all.

Figure 8:
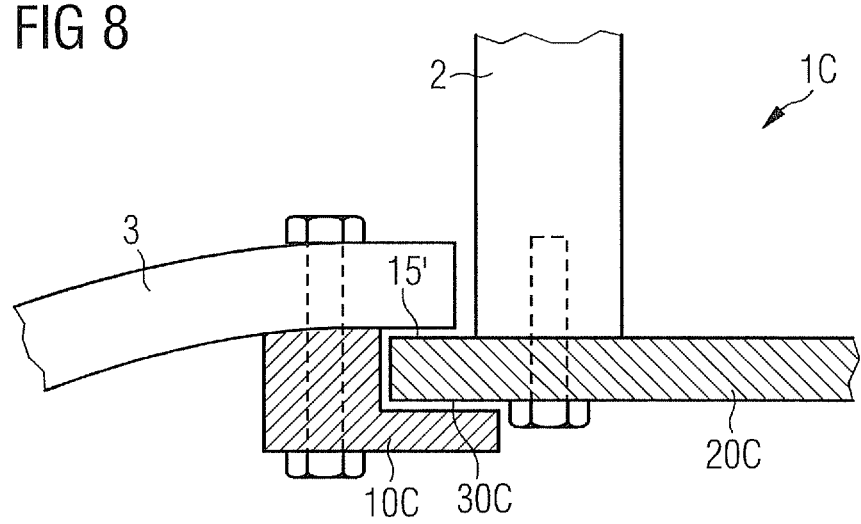
FIG. 8 shows a pitch bearing according to a sixth embodiment.

FIG. 8 shows a pitch bearing 1C according to a sixth embodiment. Here, the console segments 10C are designed to be bolted to the hub 3, so that the console housing 10C, 30C comprises the perimeter 30C of the circular opening 30 and these console segments 10C. A sliding disc 20C or sliding ring is arranged at the base of the blade 2, and this is grasped by the console housing 10C, 30C of the pitch bearing 1C. This embodiment of the pitch bearing 1C may use sliding pads (not shown) held between the faces of the sliding disc 20C and the console housing 10C, 30C, or by sliding surfaces 15' of the sliding disc 20C and the console housing 10C, 30C.

It will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. A "unit" or "module" may comprise a number of units or modules, unless otherwise stated.

The invention claimed is:

1. A pitch bearing for connecting a blade of a wind turbine to a hub of the wind turbine to allow a rotation of the blade about a longitudinal axis, comprising:

a console housing comprising a plurality of console housing segments annularly arranged at a conjunction of the hub and an end section of the blade, which console housing segments each include a plurality of planar sliding surfaces arranged around an opening in the hub, wherein each console housing segment is independently detachably connected to the blade and/or to the hub, wherein each console housing segment is operable to detach from the blade and/or the hub on the inside of the hub.

2. The pitch bearing according to claim 1,
wherein each console housing segment is operable to detach from the blade and/or to the hub on the inside of the hub while other console housing segments remain connected to the blade and/or the hub and maintain the blade in connection with the hub.

3. The pitch bearing according to claim 1,
wherein a planar sliding surface comprises a polymer surface.

4. The pitch bearing according to claim 1,
wherein each console housing segment comprises an angular cross-section.

5. The pitch bearing according to claim 1, further comprising:
a plurality of sliding pads arranged in each console housing segment, and
wherein a planar sliding surface is a surface of a sliding pad.

6. The pitch bearing according to claim 4, further comprising:
a plurality of sliding pads arranged in each console housing segment, and
wherein a planar sliding surface is a surface of a sliding pad.

7. The pitch bearing according to claim 6,
wherein sliding pads are arranged on a plurality of interior faces of each console housing segment.

8. The pitch bearing according to claim 6,
wherein each console housing segment includes at least one tension adjustment screw operable to adjust the position of a sliding pad in the respective console housing segment.

9. The pitch bearing according to claim 1,
wherein the console housing is accessible from an interior of the hub.

10. The pitch bearing according to claim 1,
wherein each console housing segment comprises a plurality of through-holes,
wherein a through-hole is arranged to accommodate a bolt to connect the respective console housing segment to the blade and/or to the hub.

11. The pitch bearing according to claim 1,
comprising a lubrication system that introduces a lubricant into the console housing.

12. The pitch bearing according to claim 11,
wherein the lubrication system comprises a plurality of lubrication channels through the body of the console housing.

13. The pitch bearing according to claim 11,
wherein the lubrication system is powered by a pitching system of the wind turbine.

14. The pitch bearing according to claim 12,
wherein the lubrication system is powered by a pitching system of the wind turbine.

15. A wind turbine comprising at least one blade attached to a hub, wherein the blade is connected to the hub via the pitch bearing according to claim 1.

16. A method of performing maintenance on a pitch bearing according to claim 1, the method comprising:
- removing one of the console housing segments of the pitch bearing while leaving the blade and other ones of the console housing segments of the pitch bearing in place, wherein removing the console housing segment is carried out inside the hub; and
- replacing the removed console housing segment after a maintenance step has been carried out.

* * * * *